(12) United States Patent
Andrasko et al.

(10) Patent No.: US 8,290,689 B2
(45) Date of Patent: Oct. 16, 2012

(54) VARIABLE EXHAUST BRAKE CONTROL VIA TURBINE VANE POSITIONING

(75) Inventors: Steven J. Andrasko, Wixom, MI (US); John P. Kresse, Martinsville, IN (US); Kevin L. Kluemper, Monrovia, IN (US); Brett R. Caldwell, New Palestine, IN (US)

(73) Assignee: GM Global Technology Operations LLC

( * ) Notice: Subject to any disclaimer, the term of this patent is extended or adjusted under 35 U.S.C. 154(b) by 420 days.

(21) Appl. No.: 12/423,482

(22) Filed: Apr. 14, 2009

(65) Prior Publication Data

US 2010/0258080 A1 Oct. 14, 2010

(51) Int. Cl.
*G06F 19/00* (2011.01)
(52) U.S. Cl. ......... 701/112; 123/320; 123/323; 123/330
(58) Field of Classification Search ............... 701/108, 701/110, 112; 123/319, 320, 325, 323, 330, 123/345–348
See application file for complete search history.

(56) References Cited

U.S. PATENT DOCUMENTS

| | | | | |
|---|---|---|---|---|
| 5,278,508 A * | 1/1994 | Bowman | ................ | 324/384 |
| 6,497,097 B2 | 12/2002 | Schmidt et al. | | |
| 6,883,318 B2 * | 4/2005 | Warner et al. | ................ | 60/602 |
| 6,968,826 B2 * | 11/2005 | Doering | ................ | 123/406.2 |
| 7,051,705 B2 * | 5/2006 | Doering | ................ | 123/350 |
| 7,167,792 B1 * | 1/2007 | Kolmanovsky et al. | ................ | 701/112 |
| 7,184,879 B1 * | 2/2007 | Lewis | ................ | 701/112 |
| 7,373,923 B2 * | 5/2008 | Trask et al. | ................ | 123/435 |
| 7,383,119 B2 * | 6/2008 | Lewis | ................ | 701/112 |
| 7,458,346 B2 * | 12/2008 | Gibson | ................ | 123/90.15 |
| 7,562,530 B2 * | 7/2009 | Kolmanovsky | ................ | 60/612 |
| 7,621,126 B2 * | 11/2009 | Kolmanovsky et al. | ................ | 60/600 |
| 8,073,610 B2 * | 12/2011 | Heap et al. | ................ | 701/102 |
| 2003/0097215 A1 * | 5/2003 | Riedle et al. | ................ | 701/110 |
| 2007/0234982 A1 * | 10/2007 | Kolmanovsky et al. | ................ | 123/90.11 |
| 2009/0118090 A1 * | 5/2009 | Heap et al. | ................ | 477/98 |
| 2009/0118091 A1 * | 5/2009 | Lahti et al. | ................ | 477/100 |
| 2010/0038158 A1 * | 2/2010 | Whitney et al. | ................ | 180/65.265 |
| 2010/0168976 A1 * | 7/2010 | Andrasko et al. | ................ | 701/70 |
| 2011/0011081 A1 * | 1/2011 | Quigley et al. | ................ | 60/600 |

* cited by examiner

*Primary Examiner* — John Kwon

(57) ABSTRACT

A control system comprising a brake torque determination module that determines a desired brake torque and a vane position determination module that determines a vane position based on an engine speed and the desired brake torque, and that adjusts the vane position to a position between an open position and a closed position. A method comprising determining a desired brake torque, determining a vane position based on an engine speed and the desired brake torque, and adjusting the vane position to a position between an open position and a closed position.

20 Claims, 5 Drawing Sheets

VARIABLE EXHAUST BRAKE CONTROL VIA TURBINE VANE POSITIONING

FIELD

The present disclosure relates to methods and systems for exhaust brake control for vehicles with internal combustion engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engines may operate in different modes under various operating conditions. For example, in a normal driving mode, a diesel engine combusts diesel fuel with air flowing through an intake manifold. Exhaust gases flow out of the engine through an exhaust manifold. Various exhaust treatment components treat the exhaust gases before they escape to the atmosphere. A turbocharger boosts air pressure in the intake manifold using energy from exhaust gas flow. An intake throttle valve (ITV) controls intake airflow.

Conversely, in an exhaust braking mode, the engine slows the vehicle by increasing exhaust backpressure and intake manifold pressure. The exhaust backpressure opposes movement of the pistons during the exhaust stroke, which applies braking forces through the driveline to slow the entire vehicle. The engine control module may stop fueling the cylinders to prevent any positive torque from being produced by combustion. A variable nozzle turbocharger (VNT) may be used to increase the exhaust backpressure by restricting exhaust flow. The ITV is opened, causing increased air mass to enter the intake side of the engine. Higher exhaust gas velocity and a high pressure differential through the turbine increase turbine speeds inside the VNT. In this manner, the pressure in the intake manifold forces more air into the cylinders, which further increases exhaust backpressure.

SUMMARY

The present disclosure provides a control system comprising a brake torque determination module that determines a desired brake torque and a vane position determination module that determines a vane position based on an engine speed and the desired brake torque, and that adjusts the vane position to a position between an open position and a closed position. In addition, the present disclosure provides a method comprising determining a desired brake torque, determining a vane position based on an engine speed and the desired brake torque, and adjusting the vane position to a position between an open position and a closed position.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
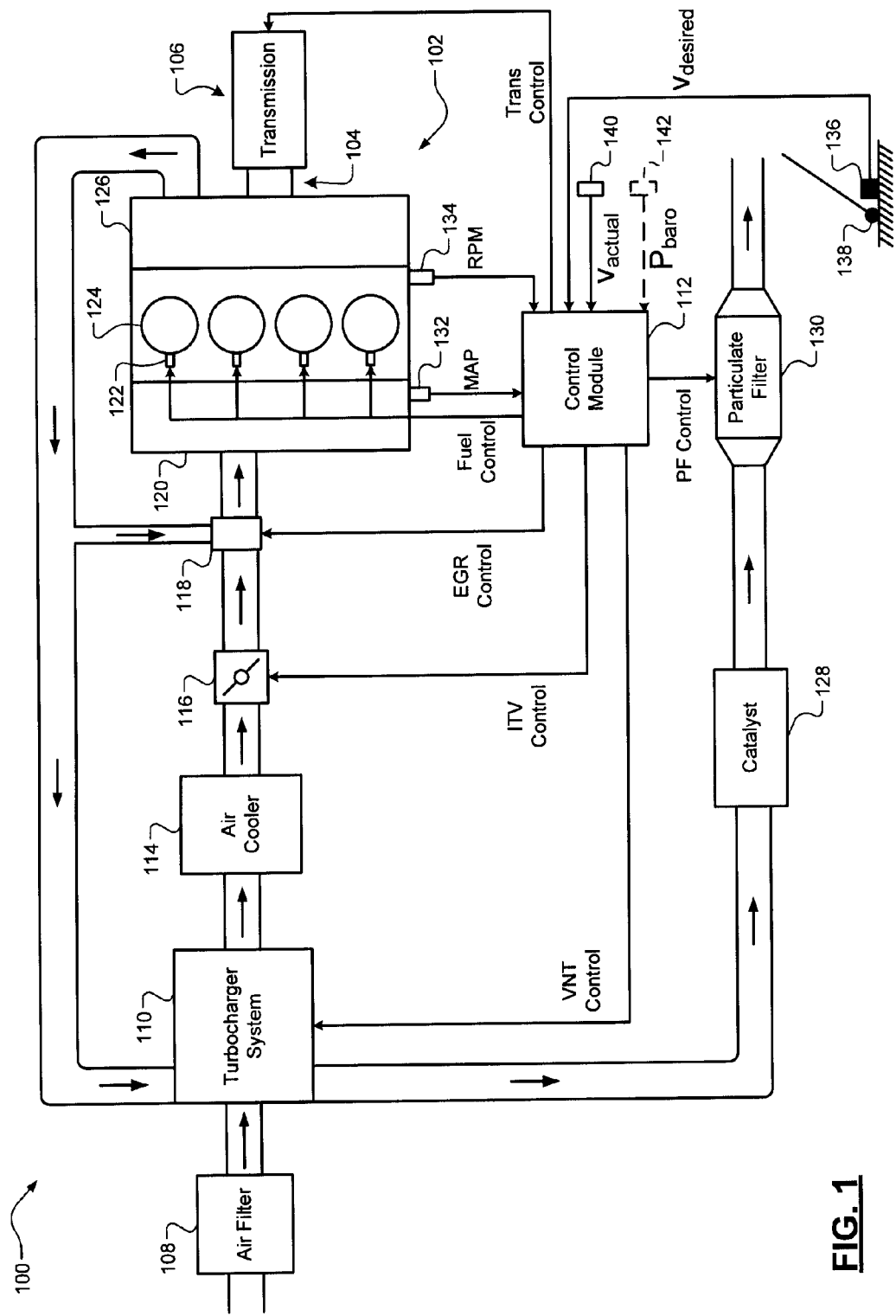
FIG. 1 is a functional block diagram of an exemplary vehicle according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A variable exhaust brake control method and system according to the present disclosure adjusts a vane position of a turbine in a turbocharger system to control exhaust brake torque based on an engine speed and a desired brake torque. A reference table may provide vane position outputs at sea level, a medium altitude, and a high altitude, and the vane position may be determined based on a barometric pressure and a weighted average of the vane position outputs. The variable exhaust brake control method and system may variably adjust the vane position to positions between an open position and a closed position. By variably adjusting the vane position rather than simply alternating the turbine vane position between open and closed positions, noticeable deceleration or acceleration due to exhaust braking may be minimized.

Referring now to FIG. 1, a functional block diagram of a vehicle 100 is presented. The vehicle 100 includes a diesel engine 102 that combusts a mixture of air and diesel fuel to produce drive torque. A coupling device 104 transfers drive torque to the transmission 106. The coupling device 104 may include a friction clutch or a torque converter depending upon the type of transmission implemented. The transmission 106 multiplies drive torque through one of a plurality of gear ratios to propel the vehicle 100. In addition, the diesel engine 102 may produce a braking effect to slow the vehicle.

Air enters the diesel engine 102 through an air filter 108 and continues through the intake side of a turbocharger system 110. The turbocharger system 110 may be a single variable nozzle turbocharger (VNT) or it may include a multiple turbocharger configuration with at least one VNT. The turbocharger system 110 compresses the air and is controlled by a control module 112. The compressed air may pass through the air cooler 114 or other conditioners before it passes through an intake throttle valve (ITV) 116. The ITV 116 may be positioned at various angles to the airflow by the control module 112. Exhaust gases may be recirculated via an EGR valve 118 to create an air mixture as the air enters an intake manifold 120. The amount of opening of the EGR valve 118 may be controlled by the control module 112.

The air mixture from the intake manifold 120 is combined with fuel from fuel injectors 122 in cylinders 124 and the resulting air-fuel mixture is combusted to produce torque. Although FIG. 1 depicts four cylinders, the diesel engine 102 may include additional or fewer cylinders 124. Exhaust gases exit the cylinder 124 through an exhaust manifold 126 and enter an exhaust side of the turbocharger system 110.

The turbocharger system 110 may restrict the flow and/or increase the velocity of the exhaust gases. Increased mass airflow and intake manifold pressure may allow for increased drive torque. Exhaust gases may flow through a catalyst 128 or other exhaust treatment components. A particulate filter 130 collects particulate matter from the exhaust gases before the gases are released to the atmosphere.

The vehicle 100 includes a manifold air pressure (MAP) sensor 132, an engine speed (RPM) sensor 134, an accelerator pedal sensor 136 engaged with an accelerator pedal 138, and a vehicle speed ($V_{actual}$) sensor 140. The control module 112 receives signals from the MAP sensor 132 and the engine speed sensor 134 indicative of the MAP and the engine speed, respectively. The control module 112 receives signals from the accelerator pedal sensor 136 and the vehicle speed sensor 140 indicative of desired and actual vehicle speeds, respectively. The control module 112 may receive signals from a barometric pressure ($P_{baro}$) sensor 142 and other components (not shown), such as a mass airflow sensor and various temperature sensors.

The control module 112 controls operation of the diesel engine 102 in various operating modes. The operating mode may be determined by various factors including driver input and other vehicle demands. Feedback from various sensors and modules may be used by the control module 112. Thus, while unidirectional arrows are shown, such as from the control module 112 to the ITV 116, signals may also be received by the control module 112. For example, the control module 112 may receive status and fault information.

In an exhaust braking mode, the control module 112 controls airflow and fuel entering the diesel engine 102 to produce a braking effect. Based on an exhaust braking request, the fuel injectors 122 may stop fueling the cylinders 124. The control module 112 closes the turbocharger system 110 to a VNT braking position to increase exhaust backpressure. The increased backpressure slows the pistons in the cylinders 124. The control module 112 opens the ITV 116 to an ITV braking position to allow greater intake airflow. The increased velocity of the exhaust gas flowing through the turbocharger system 110 increases intake manifold pressure and intake airflow due to increased turbine speeds in the turbocharger system 110.

Figure 2:
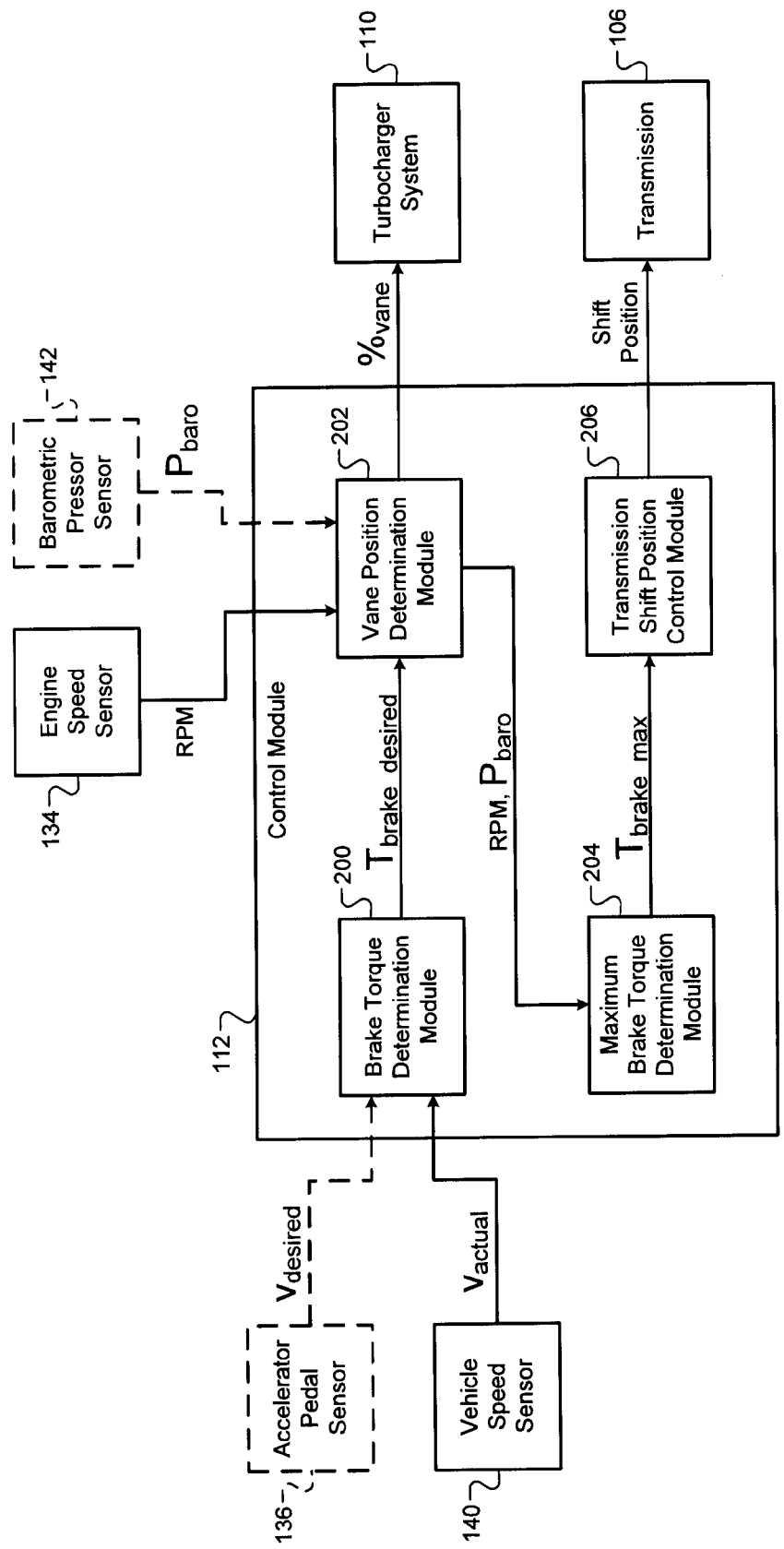
FIG. 2 is a functional block diagram of an exemplary control module according to the principles of the present disclosure.

Referring now to FIG. 2, the control module 112 includes a brake torque determination module 200, a vane position determination module 202, a maximum brake torque determination module 204, and a transmission shift position control module 206. The brake torque determination module 200 receives the actual vehicle speed from the vehicle speed sensor 140 and may receive the desired vehicle speed from the accelerator pedal sensor 136. Alternatively, the brake torque determination module 200 may receive the desired vehicle speed from a cruise control module or a similar device that determines the desired vehicle speed. The brake torque determination module 200 determines a desired brake torque ($T_{brake\_desired}$) based on the desired and actual vehicle speeds.

More specifically, the brake torque determination module 200 may calculate the desired brake torque as the brake torque required to hold the actual vehicle speed to the desired vehicle speed.

The vane position determination module 202 receives the engine speed from the engine speed sensor 134, the barometric pressure from the barometric pressure sensor 142, and the desired brake torque from the brake torque determination module 200. The vane position determination module 202 determines a vane position ($\%_{vane}$) for the turbocharger system 110 based on the engine speed, the barometric pressure, and the desired brake torque. More specifically, the vane position determination module 202 may determine the vane position using a reference table or model calculation and variably adjust the vane position to an open position, a closed position, and positions between the open position and the closed position. The vane position determination module 202 outputs the vane position to the turbocharger system 110.

The maximum brake torque determination module 204 receives the engine speed and barometric pressure and determines a maximum brake torque ($T_{brake\_max}$) based thereon. More specifically, the maximum brake torque determination module 204 may determine the maximum brake torque using a maximum brake torque reference table that provides an exhaust brake torque when a vane in the turbocharger system 110 is set to a closed position. The maximum brake torque determination module 204 may receive the engine speed and the barometric pressure from the vane position determination module 202, as depicted in FIG. 2. Alternatively, the maximum brake torque determination module 204 may receive the engine speed and the barometric pressure directly from the engine speed sensor 134 and the barometric pressure sensor 142, respectively.

The transmission shift position control module 206 receives the maximum brake torque from the maximum brake torque determination module 204 and determines a transmission shift position based thereon. More specifically, the transmission shift position control module 206 may determine a transmission shift position based on a difference between the maximum brake torque and the desired brake torque, and may output the transmission shift position to the transmission 106. For example only, the transmission shift position control module 206 may downshift the transmission 106 when the maximum brake torque is less then the desired brake torque.

Figure 3:
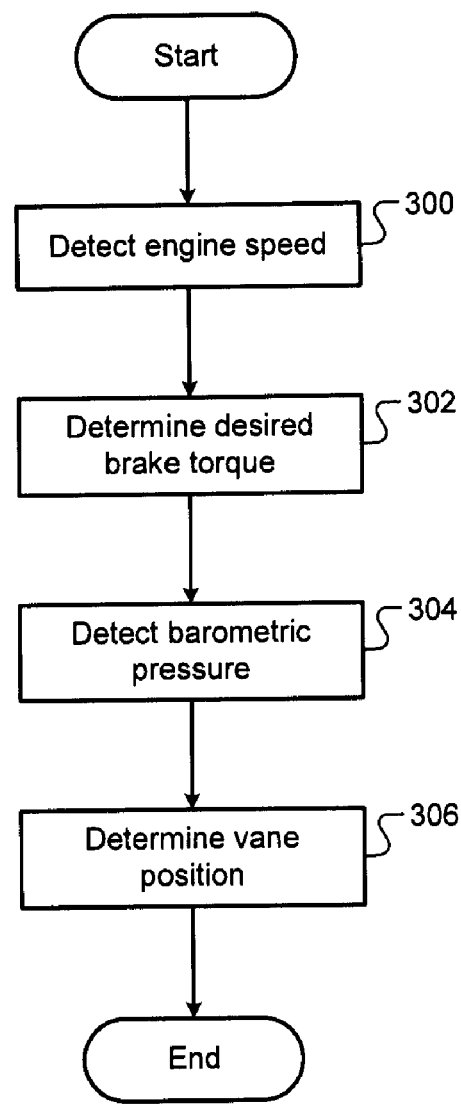
FIG. 3 is a flowchart illustrating exemplary steps of a variable exhaust brake control method according to the principles of the present disclosure.

Referring now to FIG. 3, a flowchart illustrates exemplary steps of a variable exhaust brake control method. In step 300, control detects an engine speed. In step 302, control determines a desired brake torque based on a desired vehicle speed and an actual vehicle speed. In step 304, control detects a barometric pressure. In step 306, control determines a vane position based on the engine speed, the desired brake torque, and the barometric pressure. Control may variably adjust the vane position to positions between an open position and a closed position, the open position corresponding to the maximum brake torque at the engine speed and the barometric pressure.

Figure 4:
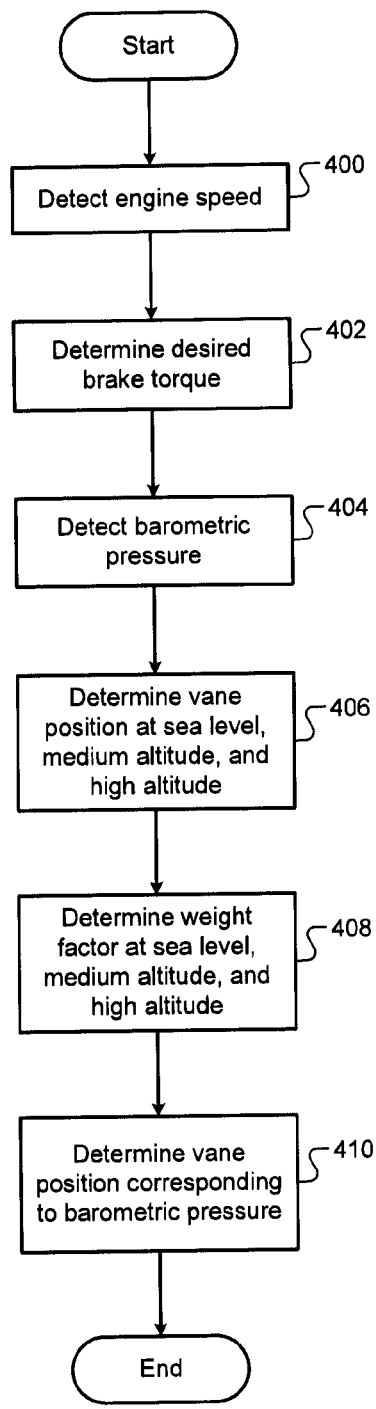
FIG. 4 is a second flowchart illustrating exemplary steps of a variable exhaust brake control method according to the principles of the present disclosure.

Referring now to FIG. 4, a second flowchart illustrates exemplary steps of a variable exhaust brake control method. In step 400, control detects an engine speed. In step 402, control determines a desired brake torque based on a desired vehicle speed and an actual vehicle speed. In step 404, control detects a barometric pressure.

In step 406, control determines a sea level vane position ($\%_{vane})_{sea\_level}$, a medium altitude vane position ($\%_{vane})_{med\_alt}$, and a high altitude vane position ($\%_{vane})_{high\_alt}$. Control determines the sea level vane position based on the engine speed, the desired brake torque, and a sea level reference table or model calculation. Control determines the medium altitude vane position based on the engine speed, the desired brake torque, and a medium altitude reference table or model calculation. Control determines the high altitude vane position based on the engine speed, the desired brake torque, and a high altitude reference table or model calculation. Control may variably adjust the vane position based on outputs from the sea level reference table or model calculation, the medium altitude reference table or model calculation, and the high altitude reference table or model calculation.

In step 408, control determines a sea level weight factor ($W_{sea\_level}$), a medium altitude weight factor ($W_{med\_alt}$), and a high altitude weight factor ($W_{high\_alt}$) based on the barometric pressure. Control may calculate the weight factors such that their sum is equal to 1 and their magnitude is directly proportional to the proximity of the barometric pressure and the corresponding altitude (i.e., set $W_{sea\_level}$ equal to 1, $W_{med\_alt}$ equal to 0, and $W_{high\_alt}$ equal to 0 when the barometric pressure corresponds to sea level). In step 410, control determines a vane position corresponding to the barometric pressure ($\%_{vane}$) based on the sea level vane position, the medium altitude vane position, the high altitude vane position, the sea level weight factor, the medium altitude weight factor, and the high altitude weight factor. More specifically, control may determine the vane position using the following equation:

$$\%_{vane} = (\%_{vane})_{sea\_level} * W_{sea\_level} + (\%_{vane})_{med\_alt} * W_{med\_alt} + (\%_{vane})_{high\_alt} * W_{high\_alt}$$

Figure 5:
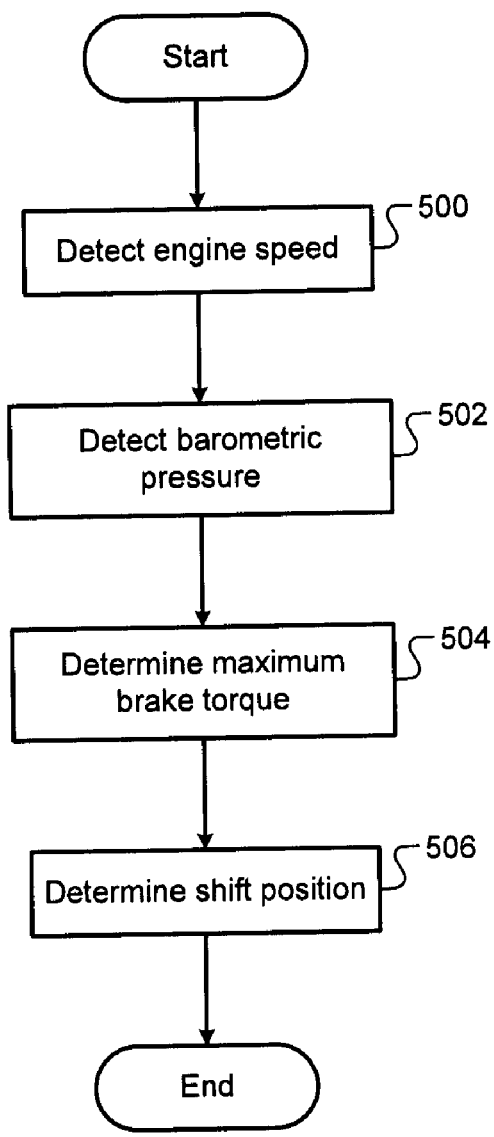
FIG. 5 is a flowchart illustrating exemplary steps of a transmission control method incorporating principles of a variable exhaust brake control method according to the present disclosure.

Referring now to FIG. 5, a flowchart illustrates exemplary steps of a transmission control method incorporating principles of the variable exhaust brake control method discussed above. In steps 500 and 502, control detects an engine speed and a barometric pressure, respectively. In step 504, control determines a maximum brake torque based on the engine speed and the barometric pressure. Control may determine the maximum brake torque using a maximum brake torque reference table that provides an exhaust brake torque when a vane in the turbocharger system 110 is set to a closed position. The maximum brake torque reference table may include multiple reference tables for varying altitudes, and control may determine the maximum brake torque using a weighted average based thereon. In step 506, control determines a transmission shift position based on the maximum brake torque.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system, comprising:
   a barometric pressure sensor that detects a barometric pressure;
   a brake torque determination module that determines a desired brake torque; and
   a vane position determination module that determines a vane position based on an engine speed, said barometric pressure, and said desired brake torque, wherein said vane position includes a position between an open position and a closed position.

2. The control system of claim 1 wherein said brake torque determination module determines said desired brake torque based on a desired vehicle speed and an actual vehicle speed, wherein said desired vehicle speed is based on input from at least one of an accelerator pedal sensor and a cruise control module, and said actual vehicle speed is based on input from a vehicle speed sensor.

3. The control system of claim 1 wherein said vane position determination module determines said vane position using at least one of a reference table and a model calculation.

4. The control system of claim 1 wherein said vane position determination module determines a sea level vane position, a medium altitude vane position, and a high altitude vane position.

5. The control system of claim 4 wherein said vane position module determines said vane position further based on said sea level vane position, said medium altitude vane position, and said high altitude vane position.

6. The control system of claim 5 wherein said vane position determination module determines a sea level weight factor, a medium altitude weight factor, and a high altitude weight factor based on said barometric pressure.

7. The control system of claim 6 wherein said vane position module determines said vane position further based on a weighted average of said sea level vane position, said medium altitude vane position, and said high altitude vane position using said sea level weight factor, said medium altitude weight factor, and said high altitude weight factor.

8. The control system of claim 1 further comprising a maximum brake torque determination module that determines a maximum brake torque based on said engine speed and said barometric pressure.

9. The control system of claim 8 further comprising a transmission shift position control module that controls a transmission shift position based on said maximum brake torque.

10. A method, comprising:
    detecting a barometric pressure;
    determining a desired brake torque; and
    determining a vane position based on an engine speed, said barometric pressure, and said desired brake torque, wherein said vane position includes a position between an open position and a closed position.

11. A method, comprising:
    detecting a barometric pressure;
    determining a desired brake torque based on a desired vehicle speed and an actual vehicle speed, wherein said desired vehicle speed is based on input from at least one of an accelerator pedal sensor and a cruise control module, and said actual vehicle speed is based on input from a vehicle speed sensor; and
    determining a vane position based on an engine speed, said barometric pressure, and said desired brake torque, wherein said vane position includes a position between an open position and a closed position.

12. The method of claim 10 further comprising determining said vane position using at least one of a reference table and a model calculation.

13. The method of claim 10 further comprising determining a sea level vane position, a medium altitude vane position, and a high altitude vane position.

14. The method of claim 13 further comprising determining said vane position based on said sea level vane position, said medium altitude vane position, and said high altitude vane position.

15. The method of claim 14 further comprising determining a sea level weight factor, a medium altitude weight factor, and a high altitude weight factor based on said barometric pressure.

16. The method of claim 15 further comprising determining said vane position based on a weighted average of said sea level vane position, said medium altitude vane position, and said high altitude vane position using said sea level weight factor, said medium altitude weight factor, and said high altitude weight factor.

17. The method of claim 10 further comprising determining a maximum brake torque based on said engine speed and said barometric pressure.

18. The method of claim 17 further comprising controlling a transmission shift position based on said maximum brake torque.

19. The control system of claim 9 wherein said transmission shift position control module downshifts a transmission when said maximum brake torque is less than said desired brake torque.

20. The method of claim 18 further comprising downshifting a transmission when said maximum brake torque is less than said desired brake torque.

* * * * *